United States Patent

[11] 3,603,821

[72] Inventor Dieter Flachsbarth
Ruckersdorf, Germany
[21] Appl. No. 825,585
[22] Filed May 19, 1969
[45] Patented Sept. 7, 1971
[73] Assignee Siemens Aktiengesellschaft
Berlin and Munchen, Germany
[32] Priority May 21, 1968
[33] Germany
[31] P 17 65 454.5

[54] CIRCUIT ARRANGEMENTS FOR PULSING THE CONTROL CURRENT OF A HALL GENERATOR
6 Claims, 9 Drawing Figs.

[52] U.S. Cl. .......... 307/309, 307/293, 307/301, 307/252 J, 307/253, 307/273, 307/291, 318/696
[51] Int. Cl. .......... H01r 5/00
[50] Field of Search .......... 307/308, 309; 338/32; 331/111

[56] References Cited
UNITED STATES PATENTS

| | | | |
|---|---|---|---|
| 2,780,752 | 2/1957 | Aldrich | 331/111 |
| 2,862,189 | 11/1958 | Kuhrt | 338/32 |
| 2,995,702 | 8/1961 | Lyon | 338/32 |
| 3,155,844 | 11/1964 | Auld | 307/309 |
| 3,297,009 | 1/1967 | Sasaki et al. | 307/309 |
| 3,305,790 | 2/1967 | Parsons | 307/309 |

*Primary Examiner*—Donald D. Forrer
*Assistant Examiner*—Harold A. Dixon
*Attorneys*—Curt M. Avery, Arthur E. Wilfond, Herbert L. Lerner and Daniel J. Tick

ABSTRACT: A pulse generator circuit includes a unijunction transistor having an emitter electrode connected to a common point in the connection between the resistor and capacitor of an RC circuit, a base 1 electrode, a base 2 electrode and an interbase path. A Hall generator is connected in series with the unijunction transistor via the interbase path of the transistor and has one control current electrode connected to the base 1 electrode of the unijunction transistor, another control current electrode connected to the capacitor of the RC circuit, one Hall voltage electrode connected to the negative polarity terminal of a source of DC voltage and another Hall voltage electrode galvanically connected to the control circuit of an electronic switching component.

CIRCUIT ARRANGEMENTS FOR PULSING THE CONTROL CURRENT OF A HALL GENERATOR

DESCRIPTION OF THE INVENTION

The present invention relates to Hall generators. More particularly, the invention relates to a circuit arrangement for pulsing the control current of a Hall generator.

Hall generators are being utilized at an increased rate in control circuits, for control operations in dependence upon a control magnetic field. For this purpose a constant control current is supplied to the control current electrodes of the Hall generator. The Hall voltage produced by the Hall generator is proportional to the control current and to the control magnetic field. For thermal reasons, the control current cannot be made as high as desired in order to produce a higher Hall voltage. Also, it is not possible to increase the force of the control magnetic field, especially when control magnets are utilized which are excited by permanent magnets. Thus, as a rule, the Hall voltage must be amplified prior to its evaluation, in order to provide control operations with the required operational reliability. DC amplifiers are not only expensive, but also entail other problems, such as zero point constancy.

Considerably higher Hall voltages may be obtained by providing a higher control current for a short period. This is accomplished by a pulsating or pulsing control current. A pulsing control current may have a magnitude which is a multiple of the rated control current for the Hall generator, provided that the pulse duration is correspondingly short. Prior to the present invention, the practical application of a pulsing control current has been restricted by the relatively high demands as to additional equipment and cost for converting the control current to pulses.

An object of the present invention is to provide a circuit arrangement for pulsing the current of a Hall generator, which circuit arrangement is of low cost, simply structure and few parts, and is efficient, effective and reliable in operation.

In accordance with the present invention, a circuit arrangement for pulsing the control current of a Hall generator having a pair of control current electrodes and a pair of Hall voltage electrodes comprises a pulse generator circuit including a unijunction transistor having emitter and base electrodes and a base-emitter path. Connecting means connects the control current circuit of the Hall generator in the base-emitter circuit of the unijunction transistor.

A source of voltage for energizing the pulse generator circuit has a positive polarity terminal and a negative polarity terminal. The pulse generator circuit includes a capacitor for determining the pulse frequency of the pulse generator. The unijunction transistor has an emitter electrode, a base 1 electrode and a base 2 electrode. The connecting means connects the base 1 electrode of the unijunction transistor to the capacitor via the control current electrodes of the Hall generator and connects both the base 1 electrode and the capacitor to the negative polarity terminal of the source of voltage via a Hall voltage electrode of the Hall generator.

A diode may be connected in forward direction between the Hall voltage electrode and the negative polarity terminal.

A switching transistor has emitter, collector and base electrodes connected to the pulse generator circuit. The other Hall voltage electrode of the Hall generator is connected to the base electrode of the switching transistor.

A thyristor may have a control electrode connected to the other Hall voltage electrode of the Hall generator.

The unijunction transistor has an interbase voltage and the source of voltage provides a rectified unfiltered alternating interbase voltage.

A bistable multivibrator is connected between the pulse generator circuit and the windings of a step motor. The Hall generator is connected between the pulse generator circuit and the bistable multivibrator and controls the switching of the bistable multivibrator.

A monostable multivibrator may be connected to the pulse generator circuit and the Hall generator is then connected between the pulse generator circuit and the monostable multivibrator and controls the switching of the monostable multivibrator.

The control current circuit of the Hall generator thus functions as the resistor of the base 1 of the unijunction transistor. The pulsing of the Hall generator provided by the circuit arrangement of the present invention produces a Hall output voltage which is so high that it may control directly, without further amplification, a thyristor or thyristors, a flip-flop or flip-flops, a trigger circuit or trigger circuits, and the like.

Since there is a conductive connection between the control current electrodes and the Hall voltage electrodes of the Hall generator, a potential separation must be provided between the control current circuit and the Hall voltage circuit, when a known circuit is used as the pulse generator.

The embodiment in which the base 1 of the unijunction transistor and the capacitor which determines the pulse frequency of the pulse generator are connected via the control current electrodes of the Hall generator and both are connected via a Hall voltage electrode to the negative polarity terminal of the voltage source, provides a completely potential-free solution. Thus, the same potential may be used for the stage connected to the output of the pulse generator. This provides a considerable saving.

The connection of a diode between the Hall voltage electrode and the negative polarity terminal of the voltage source in forward direction may increase the Hall voltage by approximately 0.7 volt, so that a lesser Hall voltage will be needed to control a transistor connected to the output of the pulse generator. It is also possible to connect a plurality of Hall generators in series, in order to control a transistor.

In order that the present invention may be readily carried into effect, it will now be described with reference to the accompanying drawing, wherein.

In the FIGS., the same components are identified by the same reference numerals.

Figure 1:
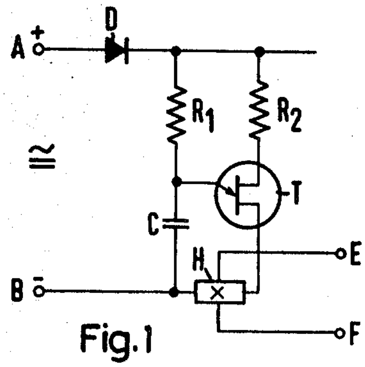
FIG. 1 is a circuit diagram of an embodiment of the circuit arrangement of the present invention for pulsing the control current of a Hall generator.

In FIG. 1, a pulse generator circuit comprises a pair of resistors $R_1$ and $R_2$, a capacitor C, and a unijunction transistor T connected via a diode D to a source of voltage A, B for energizing the pulse generator circuit. The source of voltage A, B has a positive polarity terminal A and a negative polarity terminal B. The base 1 of the unijunction transistor is connected via the control current path or circuit of a Hall generator H to the negative polarity terminal B of the voltage A, B.

The Hall voltage electrodes of the Hall generator H are connected to output terminals E and F, so that the Hall voltage is provided at said output terminals. A diode D permits the pulse generator circuit to be energized by a source of DC voltage or by a source of AC voltage at the input terminals A and B. When the pulse generator circuit is energized by DC the diode D may be eliminated.

When a direct voltage is applied to the input terminals A and B, the capacitor C charges via the resistor $R_1$, in accordance with an exponential function. The unijunction transistor T is in its nonconductive condition, so that no current flows through the Hall generator H. When the voltage at the capacitor C is further increased, however, the unijunction transistor T is switched to its conductive condition and there is a flow of high current from the capacitor C, via the emitter-base 1 path of said unijunction transistor, through the Hall generator H. The capacitor C discharges and the unijunction transistor T is again switched to its nonconductive condition.

Figures 2, 3, 4:
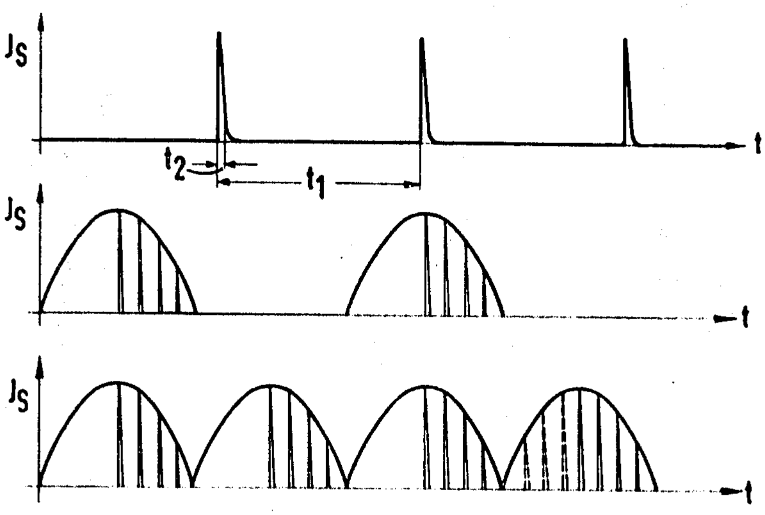
FIG. 2 is a graphical illustration of the control current pulses of the Hall generator.
FIG. 3 is a graphical illustration of the control current pulses of the Hall generator when a rectified AC voltage is provided.
FIG. 4 is a graphical illustration of the control current pulses of the Hall generator when a full-wave rectified AC voltage is provided.

FIG. 2 illustrates the control current pulses of the Hall generator H. In each of FIGS. 2, 3 and 4, the abscissa represents the time $t$ and the ordinate represents the control current $J_s$ of the Hall generator. The time of the pulse intervals $t_1$ is determined by the resistor $R_1$ and the capacitor C. The pulse duration $t_2$ is determined by the capacitor C and the inner resistance of the Hall generator H.

When the pulse generator circuit arrangement is energized by an alternating voltage, the control current of the Hall generator H is pulsed according to FIG. 3. Since the emitter ignition voltage of the unijunction transistor T has a fixed ratio or relationship to the interbase voltage of said transistor, the charging voltage of the capacitor C will remain below the ignition voltage in the first 90° of the positive half wave, during which the voltage increases from zero to a maximum. The unijunction transistor T may fire only when the alternating voltage reaches its peak value. The subsequent firing of the unijunction transistor T is accelerated as the interbase voltage of said transistor decreases. This circuit arrangement permits synchronization with the source of voltage by very simple means.

FIG. 4 shows the control current of the Hall generator H when the source of voltage is full-wave rectified without smoothing. When a control magnetic field is present, an appropriately high Hall voltage is provided at the Hall voltage electrodes E and F. The Hall voltage corresponds to the high control current pulses and may be directly utilized for the control of thyristors, flip-flop stages, trigger circuits, and the like.

Figure 8:
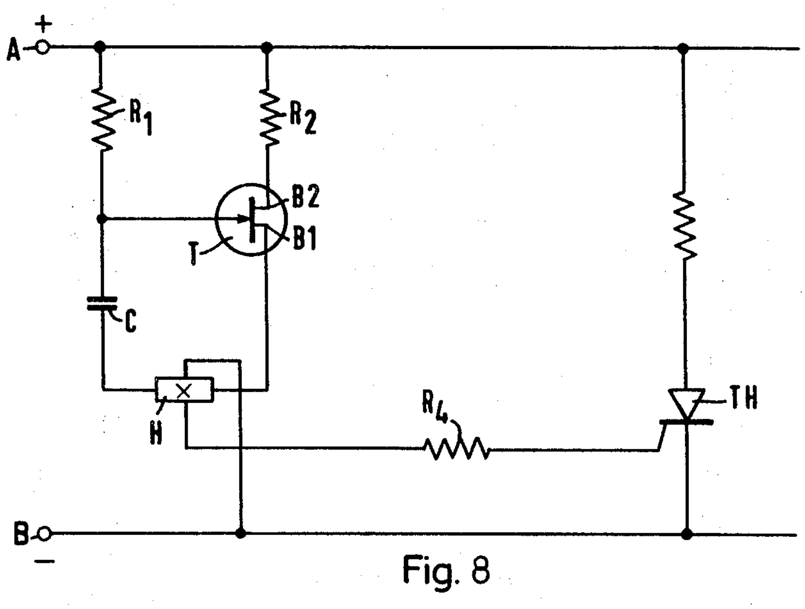
FIG. 8 is a circuit diagram of a modification of the embodiment of FIG. 5.

FIG. 8 discloses the utilization of the Hall voltage for the control of a thyristor. In FIG. 8, one of the Hall voltage electrodes is directly connected to the negative polarity terminal B of the voltage source A, B and the other of the Hall voltage electrodes is connected to the control grid of thyristor TH.

Figure 5:
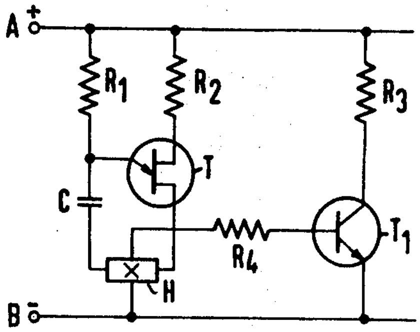
FIG. 5 is a circuit diagram of another embodiment of the circuit arrangement of the present invention for pulsing the control current of a Hall generator without requiring potential separation.

FIG. 5 shows a circuit of the present invention which, contrary to the embodiment of FIG. 1, does not require a potential separation between the control current circuit and the Hall voltage circuit of the Hall generator H. In FIG. 5, the base 1 of the unijunction transistor T is connected to the capacitor C via the control current electrodes of the Hall generator H and both said transistor and said capacitor are connected via a Hall voltage electrode to the negative polarity terminal B of the voltage source A, B.

The operation of the circuit of FIG. 5 is in two phases. The first phase constitutes the charging of the capacitor C. This is of no importance for the transistor $T_1$ circuit connected to the pulse generator circuit, since the current which flows between a control current electrode and a Hall voltage electrode is too small. During the second phase, the capacitor C is discharged via the control current path of the Hall generator H and the Hall voltage pulse controls the transistor $T_1$ via a resistor $R_4$. The base electrode of the transistor $T_1$ is connected to a Hall voltage electrode via the resistor $R_4$.

Figure 6:
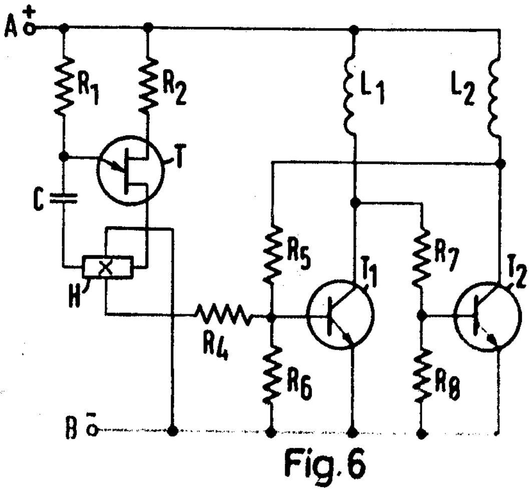
FIG. 6 is a circuit diagram of another embodiment of the current arrangement of the present invention for controlling a step motor.

In the embodiment of FIG. 6, a step motor is to be controlled in dependence upon a rotating control magnet. The step motor has two windings $L_1$ and $L_2$ which are arranged in a known manner, spatially displaced by 90°, relative to each other. The motor windings $L_1$ and $L_2$ control a permanent magnet rotor (not shown) which rotates according to the sequential step by step switching of said windings. The windings $L_1$ and $L_2$ are connected to the outputs of a bistable multivibrator or flip-flop.

The bistable multivibrator comprises two transistors $T_1$ and $T_2$ and resistors $R_5$, $R_6$, $R_7$ and $R_8$. The Hall voltage produced by the Hall generator is a pulsed voltage due to the pulsed control current. The pulsed Hall voltage controls or triggers the flip-flop in accordance with the magnetization of the Hall generator or control magnetic field to which said Hall generator is subjected.

Figure 9:
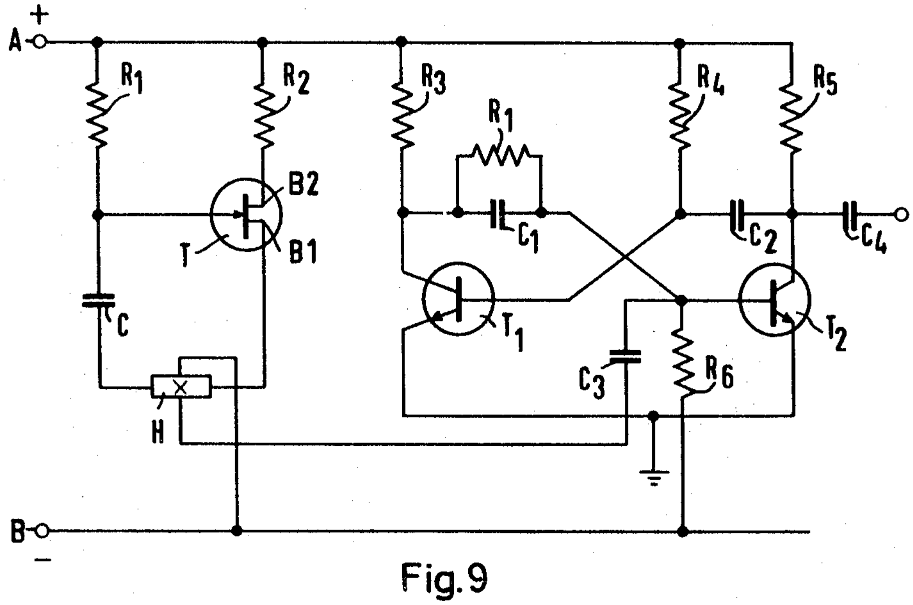
FIG. 9 is a circuit diagram of a modification of the embodiment of FIG. 6.

FIG. 9 illustrates the control of a monostable multivibrator by the Hall generator. The monostable multivibrator comprises two transistors $T_1$ and $T_2$, resistors $R_3$, $R_4$, $R_5$, $R_6$ and $R_7$, and capacitors $C_1$, $C_2$, $C_3$ and $C_4$. The pulsed Hall voltage controls or triggers the multivibrator in accordance with the magnetization of the Hall generator or control magnetic field to which the Hall generator or control magnetic field to which the Hall generator is subjected.

Figure 7:
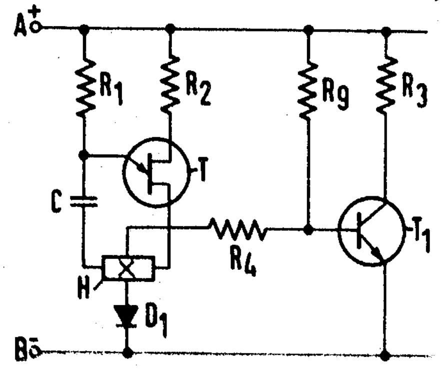
FIG. 7 is a circuit diagram of another embodiment of the circuit arrangement of the present invention for utilizing a plurality of the Hall generators.

The circuit arrangement of FIG. 5 may be further improved, as shown in FIG. 7, by connecting a diode $D_1$ in forward direction in the Hall voltage circuit of the Hall generator H. The diode $D_1$ enables the Hall voltage to be increased by approximately 0.7 volt. Thus, a smaller Hall voltage is required to control the transistor $T_1$. This permits the connection of a plurality of Hall generators to a trigger circuit.

The control voltage for a circuit connected to the pulse generator circuit may be provided at the resistor $R_3$. The base electrode of the transistor $T_1$ is connected to the positive polarity terminal A of the source of voltage A, B via a resistor $R_9$. The circuit arrangement may be so designed that ignition pulses for the unijunction transistor T are provided in the first half of the positive half wave of the AC voltage, as shown in broken lines in FIG. 4.

While the invention has been described by means of specific examples and in specific embodiments, I do not wish to be limited thereto, for obvious modifications will occur to those skilled in the art without departing from the spirit and scope of the invention.

I claim:

1. A pulse generator circuit arrangement for pulselike control of an electronic switching component having a control circuit, said circuit arrangement having a source of DC voltage having a positive polarity terminal and a negative polarity terminal, an RC circuit having a resistor and a capacitor connected in series with the resistor of the RC circuit connected to the positive polarity terminal of the source of DC voltage, said circuit arrangement comprising a unijunction transistor having an emitter electrode connected to a common point in the connection between the resistor and capacitor of the RC circuit, a base 1 electrode, a base 2 electrode and an interbase path, and a Hall generator connected in series with the unijunction transistor via the interbase path of the unifunction transistor, said Hall generator having one control current electrode connected to the base 1 electrode of the unijunction transistor, another control current electrode connected to the capacitor of the RC circuit, one Hall voltage electrode connected to the negative polarity terminal of the source of DC voltage and another Hall voltage electrode galvanically connected to the control circuit of the switching component.

2. A circuit arrangement as claimed in claim 1, wherein the electronic switching component comprises a step motor having windings an a bistable multivibrator connected between said pulse generator circuit arrangement and the windings of said step motor, and wherein the other Hall voltage electrode of said Hall generator is connected to the control circuit of said bistable multivibrator.

3. A circuit arrangement as claimed in claim wherein the electronic switching component comprises a monostable multivibrator connected to said pulse generator circuit arrangement, and wherein the other Hall voltage electrode of said Hall generator is connected to the control circuit of said monostable multivibrator.

4. A circuit arrangement as claimed in claim 1, wherein the electronic switching component comprises a switching transistor having emitter, collector and base electrodes connected to said pulse generator circuit arrangement and wherein the other Hall voltage electrode of said Hall generator is connected to the base electrode of said switching transistor.

5. A circuit arrangement as claimed in claim 1, wherein the electronic switching component comprises a thyristor having a control electrode connected to the other Hall voltage electrode of said Hall generator.

6. A circuit arrangement as claimed in claim 1, further comprising a diode connected in forward direction between said one Hall voltage electrode and said negative polarity terminal.

PO-1050
(5/69)

UNITED STATES PATENT OFFICE
CERTIFICATE OF CORRECTION

Patent No. 3,603,821 Dated September 7, 1971

Inventor(s) Dieter Flachsbarth

It is certified that error appears in the above-identified patent and that said Letters Patent are hereby corrected as shown below:

In claim 3, line 1, after "claim", insert --1--.

Signed and sealed this 18th day of April 1972.

(SEAL)
Attest:

EDWARD M.FLETCHER,JR.
Attesting Officer

ROBERT GOTTSCHALK
Commissioner of Patents